United States Patent
Kumar et al.

(10) Patent No.: US 9,623,983 B2
(45) Date of Patent: Apr. 18, 2017

(54) AIRCRAFT INTERIOR MONITORING

(71) Applicant: The Boeing Company, Chicago, IL (US)

(72) Inventors: Anil Kumar, Sammamish, WA (US); Gerald D. Lui-Kwan, Kent, WA (US)

(73) Assignee: The Boeing Company, Chicago, IL (US)

( * ) Notice: Subject to any disclaimer, the term of this patent is extended or adjusted under 35 U.S.C. 154(b) by 397 days.

(21) Appl. No.: 14/275,356

(22) Filed: May 12, 2014

(65) Prior Publication Data

US 2015/0321768 A1  Nov. 12, 2015

(51) Int. Cl.
*G08C 19/22* (2006.01)
*H04Q 9/00* (2006.01)
(Continued)

(52) U.S. Cl.
CPC ......... *B64D 45/00* (2013.01); *G08B 13/1965* (2013.01); *G08B 13/19656* (2013.01);
(Continued)

(58) Field of Classification Search
CPC .......... G08B 13/1965; G08B 13/19645; B64D 45/0015; B64D 2221/00; G08G 5/0026;
(Continued)

(56) References Cited

U.S. PATENT DOCUMENTS 4,750,197 A   6/1988 Denekamp et al.
6,246,320 B1 * 6/2001 Monroe ............. B64D 45/0015
                                                 340/506
(Continued)

FOREIGN PATENT DOCUMENTS

WO  2007055720 A2  5/2007
WO  2008097983 A1  8/2008

OTHER PUBLICATIONS

European Patent Office, International Search Report and Written Opinion for International Application No. PCT/US2015/028905 dated Jul. 17, 2015, 15 pages.

(Continued)

*Primary Examiner* — Firmin Backer
*Assistant Examiner* — Jerold Murphy
(74) *Attorney, Agent, or Firm* — Charles L. Moore; Moore & Van Allen PLLC (57) ABSTRACT

A system for monitoring an aircraft interior may include a multiplicity of sensors each placed at a selected location of a plurality of locations within the aircraft interior. Each sensor is configured to monitor a condition in an associated area of the aircraft interior. The system may also include a server onboard the aircraft. The onboard server is configured to receive data from each of the multiplicity of sensors and to control operation of each of the multiplicity of sensors. The system may also include a router onboard the aircraft. The onboard router is configured to communicate with a router off-board the aircraft and to transfer data from the onboard server to the off-board router. The off-board router is associated with a ground monitoring facility that is configured to analyze data from each of the multiplicity of sensors, check or compare the data to reference data and depending upon any levels being exceeded an appropriate alert may be generated.

20 Claims, 3 Drawing Sheets

(51) Int. Cl.
    *G08B 29/00* (2006.01)
    *G08B 21/00* (2006.01)
    *G05D 1/00* (2006.01)
    *B64D 45/00* (2006.01)
    *G08B 13/196* (2006.01)

(52) U.S. Cl.
    CPC .. *G08B 13/19665* (2013.01); *G08B 13/19673* (2013.01); *G08B 13/19695* (2013.01); *H04Q 9/00* (2013.01)

(58) Field of Classification Search
    CPC .......... G08G 5/0082; H04B 2203/5458; H04B 2203/5466; H04N 7/181; G07C 5/008; H04L 2012/4028
    See application file for complete search history.

(56) References Cited

U.S. PATENT DOCUMENTS

| | | | | |
|---|---|---|---|---|
| 8,401,021 B2* | 3/2013 | Buga | .................. | H04B 7/18506 370/395.42 |
| 8,515,656 B2* | 8/2013 | Reed | ........................ | B64D 9/00 244/137.1 |
| 9,424,607 B2* | 8/2016 | Bowers | .................. | G06Q 40/08 |
| 2004/0225673 A1* | 11/2004 | Beck | ................. | G06F 17/30598 |
| 2005/0069207 A1* | 3/2005 | Zakrzewski | ....... | B64D 45/0015 382/190 |
| 2008/0300750 A1 | 12/2008 | Davis | | |
| 2011/0035139 A1* | 2/2011 | Konlditslotis | ......... | G07C 5/008 701/119 |
| 2013/0003756 A1* | 1/2013 | Mitchell | ................ | H04B 3/542 370/464 |
| 2014/0279740 A1* | 9/2014 | Wernevi | ............... | G06N 99/005 706/12 |
| 2015/0067819 A1* | 3/2015 | Shribman | ............... | H04L 67/06 726/12 |

OTHER PUBLICATIONS

Wikipedia, "Simple Network Management Protocol," downloaded from <Http://en.wikipedia.org/wiki/Snmp> on Mar. 11, 2014, pp. 1-12.

Wikipedia, "MPEG-14," downloaded from <http://en.wikipedia.org/wiki/MPEG-4> on Mar. 11, 2014, pp. 1-14.

Wikipedia, "Spatiotemporal Database," downloaded from <http://wikipedia.org/wiki/Spatio-temporal_database> on Apr. 11, 2014, pp. 1-2.

International Bureau of WIPO; International Preliminary Report on Patentability for International Patent Application No. PCT/US2015/028905 dated Nov. 24, 2016, 12 Pages.

* cited by examiner

FIG. 3

AIRCRAFT INTERIOR MONITORING

FIELD

The present disclosure relates to aircraft, and more particularly to a system and method for monitoring an interior area of an aircraft, such as a cargo area.

BACKGROUND

Monitoring, such as video surveillance of aircraft while on the ground, for example, at a gate at an airport, is a highly desirable capability by airlines to secure the aircraft cabin, flight deck, cargo areas and other areas onboard where security may be important. Monitoring loading and unloading operations on aircraft in the cargo area is important for many airlines to ensure secure and cost effective operation. One area of concern is baggage tampering or damage during flight that has an impact on passenger satisfaction and reputation of the airline. Another reason is to understand the bottlenecks in the gate Turn Around Time (TAT) critical to improve operational efficiency. Wireless gate links (Wi-Fi and Cellular) are currently available to provide off-board communications. Wi-Fi systems however are subject to congestion near the airport terminal area and cannot reliably provide video streaming off of the airplane due to the requirement to have multiple video streams of about 1 to about 3 Megabits per second (Mbps) for the surveillance system. In addition the security of the Wi-Fi system may be an issue. Cellular gate link may be more secure; however, current 3G capabilities are limited in bandwidth. 4G capability provides a higher bandwidth but the cost may be prohibitive to provide constant streaming of high bandwidth video over the cellular backbone.

SUMMARY

In accordance with an embodiment, a system for monitoring an interior of an aircraft, such as a cargo area may include a set of sensors in the cargo compartment(s) and other areas of the interior of the aircraft. The multiple sensors may include but are not necessarily limited to audio sensors, video sensors and temperature sensors. Data gathered from the sensors may be stored both on the aircraft and at a ground monitoring facility for online and offline analysis. The system may also include a database to support spatio-temporal analytical queries. The system may define a sensor based interactive Cargo Area Monitoring (iCAM) system. The number of sensors will depend on the spatial resolution required for a specific cargo area. The temporal resolution will determine the sampling rate of the data from these sensors.

In accordance with an embodiment, a system for monitoring an aircraft interior may include a multiplicity of sensors each placed at a selected location of a plurality of locations within the aircraft interior. Each sensor is configured to monitor a condition in an associated area of the aircraft interior. The system may also include a server onboard the aircraft. The onboard server is configured to receive data from each of the multiplicity of sensors and to control operation of each of the multiplicity of sensors. The system may also include a router onboard the aircraft. The onboard router is configured to communicate with a router off-board the aircraft and to transfer data from the onboard server to the off-board router. The off-board router is associated with a ground monitoring facility that is configured to analyze data from each of the multiplicity of sensors.

In accordance with another embodiment, a system for monitoring an aircraft interior may include a ground monitoring facility configured to analyze data from a multiplicity of sensors each placed at a selected location of a plurality of locations within the aircraft interior. Each sensor is configured to monitor a condition in an associated area of the aircraft interior. The system may also include an off-board router associated with the ground monitoring facility. The off-board router is configured to communicate with a router onboard the aircraft. The onboard router is configured to transfer data from an onboard server to the off-board router and the ground monitoring facility. The onboard server is configured to receive data from each of the multiplicity of sensors and to control operation of each of the multiplicity of sensors.

In accordance with an additional embodiment, a method for monitoring an aircraft interior may include establishing, by an onboard server, communications with each of a multiplicity of sensors. Each sensor may be placed at a selected location of a plurality of locations within the aircraft interior and each sensor is configured to monitor a condition in an associated area of the aircraft interior. The method may also include establishing, by the onboard server, communications with a ground monitoring facility that is configured to analyze the data from each of the multiplicity of sensors to detect anomalies. The method may additionally include storing the data from the multiplicity of sensors in an off-board database associated with the ground monitoring facility. The off-board database may include a reference table configured to store the data from each of the multiplicity of sensors that is within limits and an exceedance table to store data from the multiplicity of sensors that exceeds a predetermined threshold. The ground monitoring facility is configured to perform a method that may include comparing new data from each sensor to previously stored data for the sensor in the reference table; storing the new data in the reference table in response to the data not exceeding the predetermined threshold; storing the new data in the exceedance table in response to the new data exceeding the predetermined threshold; and generating an alarm in response to the new data from a particular sensor exceeding the predetermined threshold for a preset number of samples of the new data from the particular sensor or expiration of a preset time period.

BRIEF DESCRIPTION OF THE SEVERAL VIEWS OF DRAWINGS

The following detailed description of embodiments refers to the accompanying drawings, which illustrate specific embodiments of the disclosure. Other embodiments having different structures and operations do not depart from the scope of the present disclosure.

DETAILED DESCRIPTION

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Figure 1:
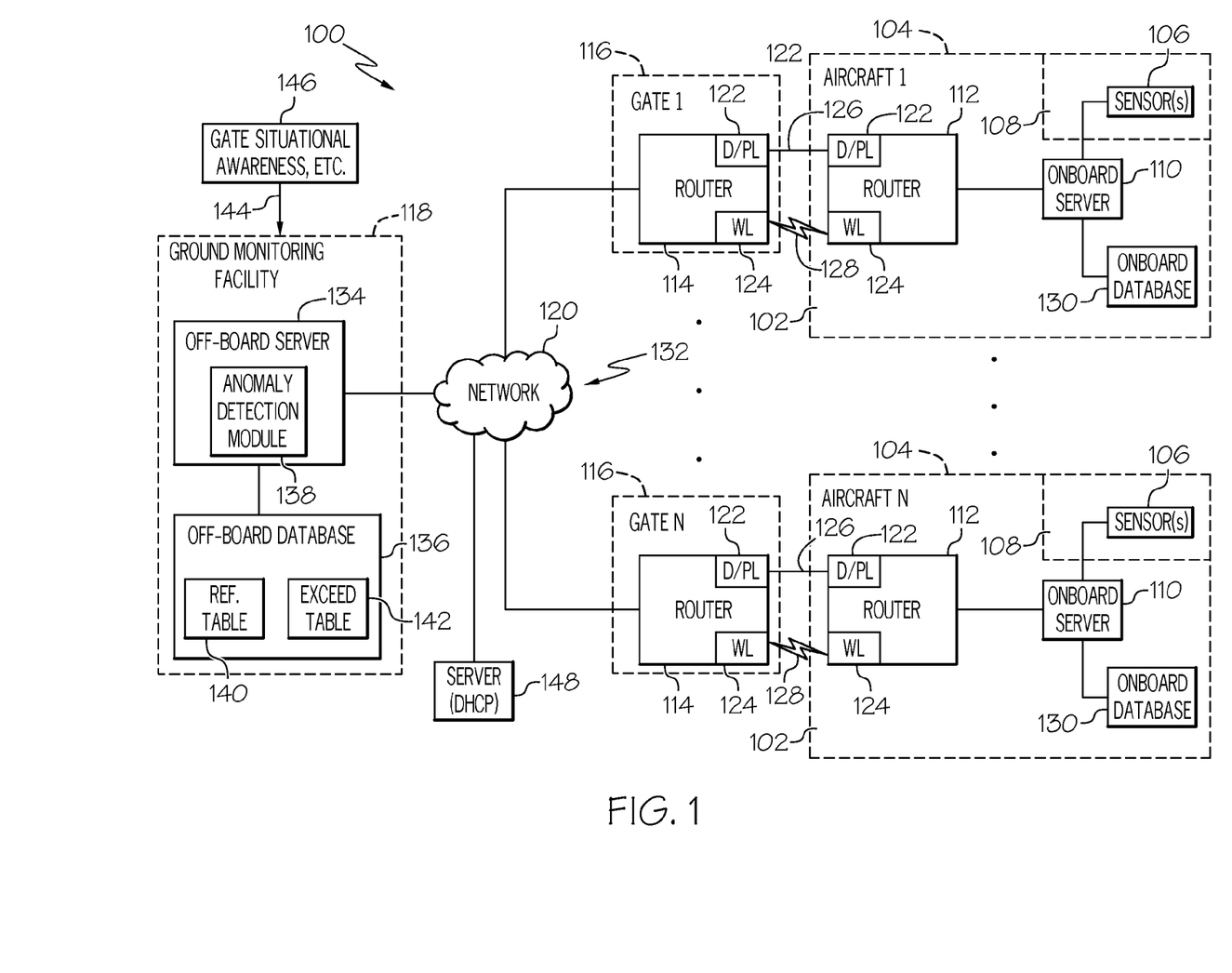
FIG. 1 is a block schematic diagram of an example of a system for monitoring an interior of an aircraft in accordance with an embodiment of the present disclosure.

FIG. 1 is a block schematic diagram of an example of a system 100 for monitoring an interior 102 of an aircraft 104 in accordance with an embodiment of the present disclosure. The interior 102 may be a particular area of the aircraft 104, such as the cargo area or cargo areas or other areas of the aircraft 104 where surveillance or monitoring may be desired. For example, monitoring or surveillance in the cargo area of a commercial aircraft or airliner may be of particular value to an airline to ensure secure and cost effective operation. As previously discussed baggage tampering or damage is of particular concern to airlines. Baggage tampering, damage or loss can result in lost revenue in settlement of claims and may have an adverse impact on passenger satisfaction and reputation of the airlines.

The system 100 may include a multiplicity of sensors 106 each placed at a selected location of a plurality of locations within the aircraft interior 102. Each sensor 106 may be configured to monitor a particular condition in an associated area 108 of the aircraft interior 102. The multiplicity of sensors 106 may include, for example but are not necessarily limited to, a set of video sensors or video cameras, a set of audio sensors and a set of temperature sensors. Accordingly the conditions monitored may include but is not necessarily limited to any tampering or damage of baggage or equipment based on the video and audio data, extreme temperature conditions, such as those that may be caused by high heat or fire that could cause damage to baggage and aircraft components. The sensors 106 may be mounted at selected locations within the aircraft 104. For example, video cameras may be located in selected locations to provide substantially complete surveillance of the cargo area or cargo areas of the aircraft 104. The set of video cameras and other sensors my each be placed to monitor a particular portion of the cargo area or cargo areas and other portions of the interior of the aircraft where monitoring may be desired. The system 100 may define a sensor based interactive Cargo Area Monitoring (iCAM) system. The number of sensors 106 will depend on the spatial resolution required for a specific cargo area. The temporal resolution will determine the sampling rate of the data from these sensors 106. The iCAM system would be normally inactive while the aircraft 104 is in flight. Although, cargo monitoring functions could be done while in flight, such as smoke detection as human incursion into the cargo area during flight may be highly unlikely.

The system 100 may also include a server 110 onboard the aircraft. The onboard server 110 is configured to receive data from each of the multiplicity of sensors 106 and to control operation of each of the multiplicity of sensors 106. For example, video sensors or cameras may be controlled by a user at a ground monitoring facility 118 to pan or scan an area, zoom in and out or perform other functions.

The system 100 may also include a router 112 onboard the aircraft 104. The onboard router 112 may be configured to communicate with another router 114 off-board the aircraft 104 and to transfer data from the onboard server 110 to the off-board router 114. The off-board router 114 may be located at a gate 116 of an airport, ground maintenance facility or some other ground location. The off-board router 114 may be associated with or communicatively coupled to a ground monitoring facility 118. As described in more detail herein, the ground monitoring facility 118 may be configured to analyze the data from each of the multiplicity of sensors 106 and detect any anomalies from the analysis of the data. The data from each of the multiplicity of sensors 106 may be checked or compared to reference data, as described in more detail herein, and depending upon any of the data from the sensors 106 exceeding any levels in the corresponding reference data, an appropriate alert may be generated. The ground monitoring facility 118 may be located at a remote location from the airport and off-board router 114, such as at a geographically centralized airline's office or facility. The off-board router 114 may be coupled to the ground monitoring facility 118 via a network 120. For example, the network 120 may be the Internet, a private network, dedicated communications link or other means of data communications.

In accordance with an embodiment, the onboard router 112 may be associated with or may include both a data over power line interface 122 and a wireless interface 124 for communications with the off-board router 114. In other embodiments, the onboard router 112 may include only the data over power line interface 122 or only the wireless interface 124. The off-board router 114, depending upon how equipped, may also be associated with or may include both a data over power line interface 122 and a wireless interface 124 for communications with the onboard router 112 or in other embodiments may include only one or the other of the interfaces 122 and 124. Accordingly, if both the onboard router 112 and off-board router 114 include a data over power line interface 122, the onboard router 112 may then be connectable to the off-board router 114 by a power line that supplies power to the aircraft 104 when the aircraft 104 is parked at a gate 116 at an airport or other ground facility. A wired communications link 126 may be established between the onboard router 112 and off-board router 114 via the data over power line interfaces 122, and the wired link 124 may be over the plug-in power cable used to supply power to the aircraft 104 when the engines of the aircraft 104 are shut-down at the gate 116 or other ground facility.

If both the onboard router 112 and the off-board router 114 include a wireless communications interface 124, a wireless communications link 128 may be established between the onboard router 112 and the off-board router 114 via the wireless communications interfaces 124 when the aircraft 104 is parked at a gate 116 or other facility. If the routers 112 and 116 include or are associated with both data over power line interfaces 122 and wireless interfaces 124 then either a wired communications link 126 or a wireless communications link 128 may be established between the routers 112 and 114. The wireless communications interfaces 124 and connectivity may be on Wi-Fi, Worldwide Interoperability of Microwave Access (WiMax), cellular, or some other wireless communications standard or protocol. In the exemplary embodiment illustrated in FIG. 1 the data over power line interfaces 122 and wireless interfaces 124 are shown as being integral components of the onboard router 112 and the off-board router 114. However, the interfaces 122 and 124 may also each be separate components from the respective router 112 and 114 that are associated with or communicatively coupled to the routers 112 and 114.

The system 100 may also include an onboard database 130 associated with the onboard server 110. The onboard database 130 may be configured to store the data from the sensors 106 in response to the onboard server 110 being unable to establish a secure communications link 132 with the ground monitoring facility 118 via the routers 112 and 114 and the network 120. The data stored in the onboard database 130 may be transferred to the ground monitoring facility 118 when the onboard server 110 is able to establish the secure communication link 132 with the ground monitoring facility 118. The onboard database 130 may have limited storage capacity and the sensor data may be deleted from the onboard database 130 after being transferred to the ground monitoring facility 118. As previously described, the multiplicity of sensors 106 may include at least one of a set of video sensors or cameras, a set of audio sensors, a set of temperature sensors and other sensors to monitor a particular area of the aircraft interior 102. The data from each sensor 106 may be stored with at least an associated time stamp when the data was received by the onboard server 110 and a location of the sensor. An identification of the aircraft is associated with the data when transferred to the ground monitoring facility 118.

The ground monitoring facility 118 may include a server 134 for receiving the data from the sensors 106. The ground monitoring facility server 134 may also be referred to as an off-board server. The ground monitoring facility 118 may also include an off-board database 136 associated with the off-board server 134 as illustrated in the exemplary embodiment in FIG. 1. In another embodiment, the off-board database 136 may be a separate component from the ground monitoring facility 118. The off-board database 136 may store data from each sensor 106 in association with an identification of the aircraft, such as the aircraft tail number, a location of the sensor, a time stamp when the data was received by the onboard server 110 and any other data or information that may be useful in detecting anomalies based on the data and generating a notification or alarm as described herein.

An anomaly detection module 138 may operate or run on the server 134. The anomaly detection module 138 may be configured to detect anomalies in the data from the multiplicity of sensors 106 and may generate an alarm or notification in response an anomaly being detected. In accordance with an embodiment, the off-board database 136 may include a reference table 140 configured to store the data from each of the multiplicity of sensors 106 that is within limits and an exceedance table 142 to store data from the multiplicity of sensors 106 that exceeds a predetermined threshold. An alarm, alert or other notification may be generated and presented to a user at the ground monitoring facility 118 in response to the data from a particular sensor exceeding the predetermined threshold for a preset number of samples of the data from the particular sensor or expiration of a preset time period. An example of the reference table 140 and the exceedance table 142 are illustrated in FIG. 3 as reference table 300 and exceedance table 302. An exemplary method for generating the alarm or notification will be described in more detail with reference to FIG. 2 and FIG. 3.

The system 100 may also include other feeds or communications links 144 coupled to the ground monitoring facility 118 for receiving other data that may be useful in detecting anomalies from the data from the sensors 106. For example, data corresponding to gate situational awareness 146, such as video and audio data, may be received by the ground monitoring facility 118 and factored into the analysis by the off-board server 134.

The system 100 may also include another off-board server 148, such as a Dynamic Host Configuration Protocol (DHCP) server or similar server, that may provide an Internet Protocol (IP) address to the onboard server 110 to establish the onboard server 110 as an endpoint of an off-board communications network, such as network 120.

Figure 2:
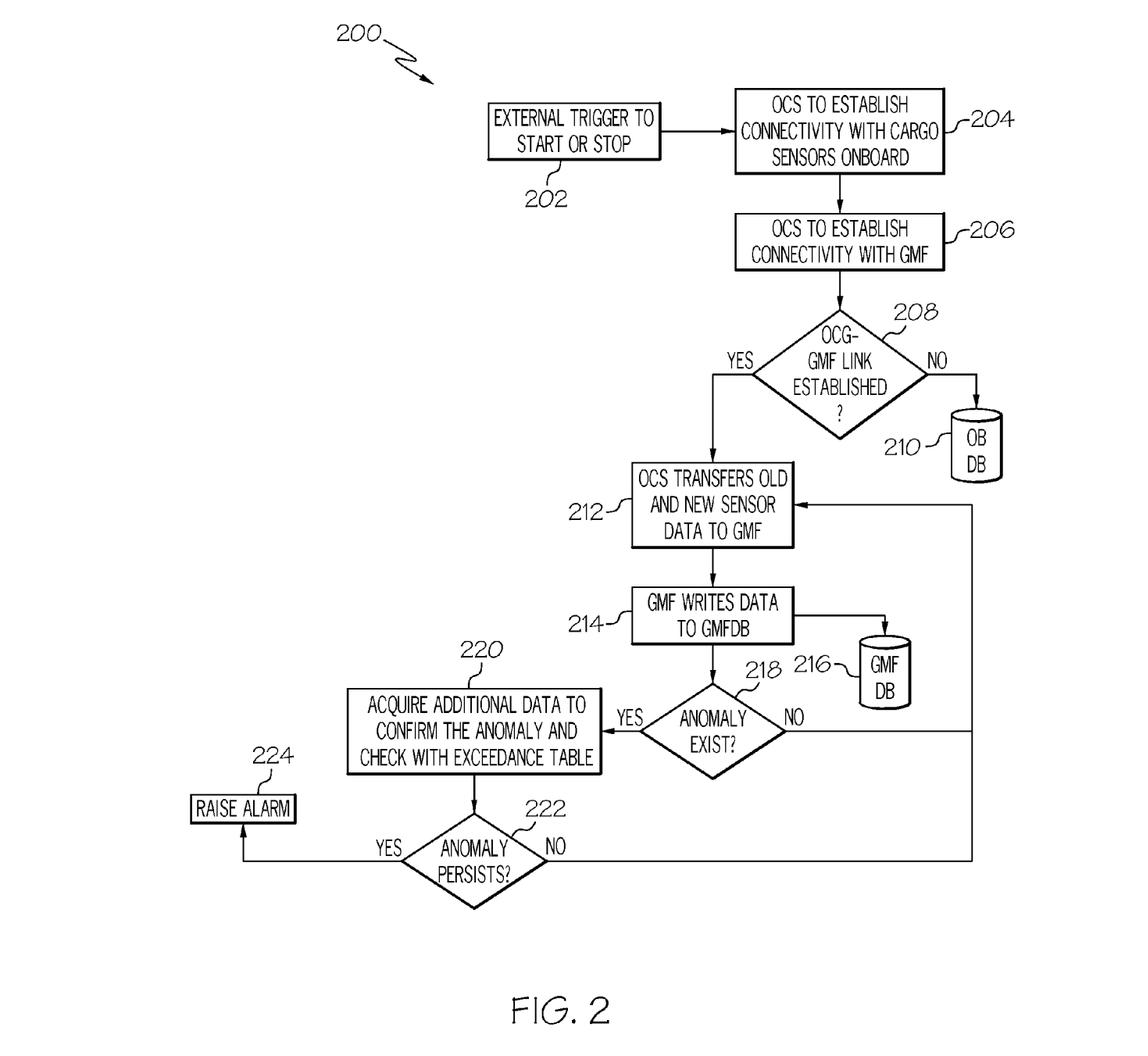
FIG. 2 is an example of a method for monitoring an interior of an aircraft in accordance with an embodiment of the present disclosure.
Figure 3:
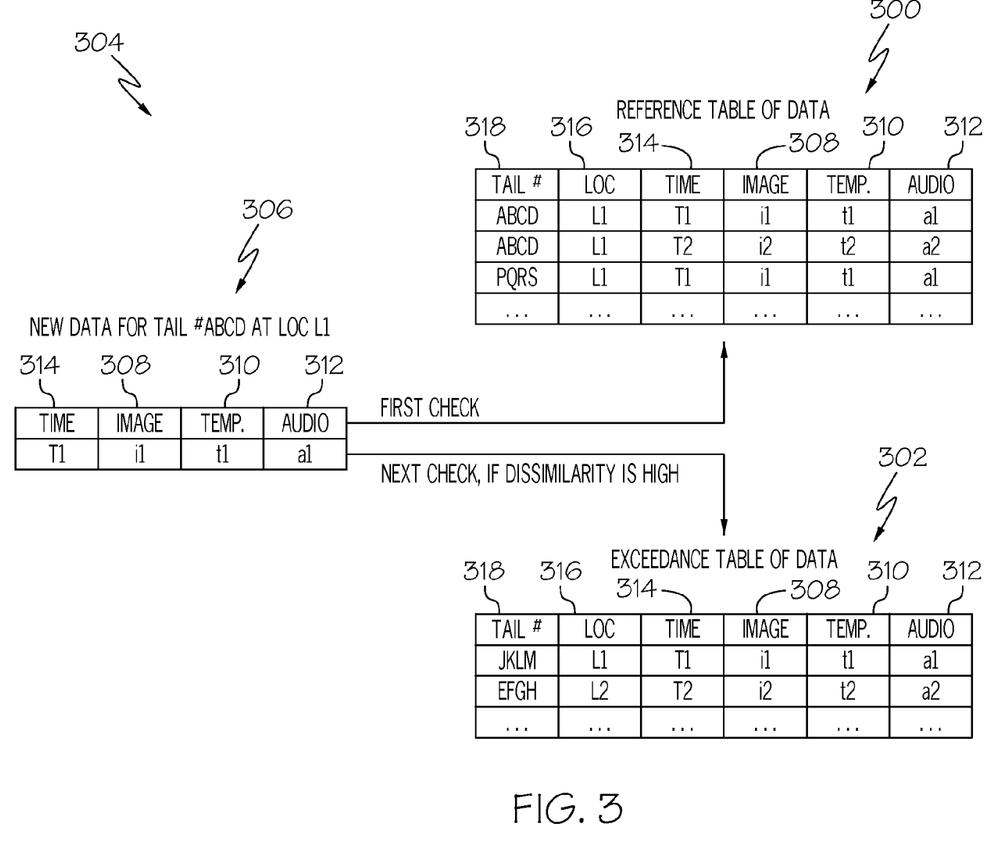
FIG. 3 is an example of a reference table and an exceedance table and a method for checking conditions for determining an anomaly in accordance with an embodiment of the present disclosure.

FIG. 2 is an example of a method 200 for monitoring an interior of an aircraft in accordance with an embodiment of the present disclosure. The method 200 may be embodied in the system 100 of FIG. 1. In block 202, an external trigger may be received by an onboard server, such as an onboard cargo server (OCS) or other onboard server, to start or stop the method 200.

In block 204, connectivity may be established by the onboard server or OCS with a multiplicity of sensors. For example, an onboard server (onboard server 110 in FIG. 1) may be configured to activate each sensor, such as sensors 106 in FIG. 1, to monitor a condition in an associated area of the aircraft interior in response to a set of signals.

In block 206, the onboard server or OCS may establish connectivity or a communications link with the ground monitoring facility (GMF). The onboard server or OCS may be configured to activate off-board connectivity with the off-board router and ground monitoring facility using either a wireless communications link or wired communications link using data over power line interfaces, similar to that previously described, in response to a set of signals. The set of signals may include a first signal indicating a weight on wheels configuration or condition of the aircraft, a second signal that may indicate a parked configuration or zero velocity condition of the aircraft, and a third signal that may indicate opening of a door or hatch to the cargo area. The onboard server or OCS may also be configured to activate each sensor in a cargo area of an aircraft in response to the set of signals. The onboard server or OCS may also be configured to deactivate the off-board connectivity and each of the sensors in the cargo area in response to a fourth signal indicating that each door to the cargo area has been closed and locked or sealed.

The onboard server may establish connectivity by requesting and receive an internet protocol (IP) address from an off-board server, such as server 148 in FIG. 1, to establish the onboard server as an endpoint with an off-board communications network, such as communications network 120 in FIG. 1. A request may then be transmitted by the onboard server to establish a connection with the ground monitoring facility or the appropriate domain name address for the airline's back office network. The onboard server may be authenticated by the ground monitoring facility using techniques similar to those known in the communications art. For example, the onboard server may authenticate itself with the airline network's border routers via the Institute of Electrical and Electronic Engineers (IEEE) Standard 802.1X authentication services or other authentication technique. After authentication, a secure communications link may be established for secure transfer of data between the onboard server and the ground monitoring facility. A Virtual Private Network (VPN) tunnel may be established to further secure the data transfer between the onboard server and the ground monitoring facility or server of the ground monitoring facility.

The type of data being transferred or monitoring data belongs to the Airplane Information System (AIS) domain as this does not impact the safety of flight and is carried out only on the ground. The security policy at a location may be such that this type of information is only routed over one of many possible off-board communications links.

In block 208, a determination may be made if the secure communications link has been established between the onboard server and the ground monitoring facility. If the secure communications link has not been established, the data from the sensors may be stored in an onboard database 210 that may be similar to onboard database 130 in FIG. 1.

If the secure communications link has been established between the onboard server and the ground monitoring facility, the method 200 may advance to block 212.

In block 212, the onboard server may transfer old and new sensor data to the ground monitoring facility. The old sensor data may be sensor data which has been stored on the onboard database 210 because the secure communications link could not previously be established for some reason. This could be because some network failure occurred or because the aircraft was at an airport which did not include equipment similar to that described with reference to FIG. 1 to support monitoring an interior of the aircraft similar to that described herein. The new data may be sensor data which is currently being received or is being received in real-time from the sensors and transferred directly by the onboard server and onboard router to the ground monitoring facility.

In block 214, the ground monitoring facility or off board server associated with the ground monitoring facility may store the sensor data in a database 216 associated with the ground monitoring facility. The database 216 may be similar to the off-board database 136 in FIG. 1. The database 216 may be structured to support at least three main sources of data, audio, image and temperature. The database 216 may also be structured to store other sources of data that may be useable in monitoring the interior of an aircraft and detecting anomalies similar that described herein. The sensor data may be stored for off-line analysis similar to that described herein. As previously discussed, the off-board database 216 may store the data from each sensor in association with an identification of the aircraft, the location of the sensor, a time stamp when the data was received by the onboard server and any other information that may be useful in detecting anomalies similar to that described herein.

The cargo compartments or areas may be divided into spatial regions and each data collected may be stacked with time stamps against a tail number of the aircraft and location of the sensors. Past data collected for the aircraft at the same location may form the reference data in the reference table for comparison purposes. A compressed image file (M-JPEG) gathered from the video camera, the audio and temperature sensed may be divided into regions at pre-defined sampling intervals. The comparative assessment built into the anomaly detection module in the ground monitoring facility may be based on meeting the conditionality of acceptable variation between the collected and reference data. If the distance of similarity is large (low correlation) then additional finer data may be collected to minimize the probability of a false alarm. An event trigger results if the distance of similarity continues to be larger than a threshold limit. The continued exceedance of a set of data would result in raising an alarm for the ground cargo controller to take action. The data set that caused the trigger may be stored separately in a new table that may be utilized for future comparison.

In block 218, a determination may be made whether an anomaly exists. Similar to that previously described, the off-board database 216 may include a reference table configured to store the data from each of the multiplicity of sensors that is within limits and an exceedance table to store data from the multiplicity of sensors that exceeds a predetermined threshold. Referring also FIG. 3, FIG. 3 illustrates an example of a reference table 300 and an exceedance table 302 and a method 304 for checking conditions for determining an anomaly in accordance with an embodiment of the present disclosure. The method depicted by FIG. 3 may be embodied in the anomaly detection module 138 of the ground monitoring facility 118 in FIG. 1. Accordingly, the ground monitoring facility or anomaly detection module may be configured to compare new data 306 from each sensor to previously stored data for the sensors in the reference table 300. For example, a particular sensor location may include image sensor data 308 from a video sensor or camera, temperature sensor data 310 from a temperature sensor and audio sensor data 312 from an audio sensor or microphone. A time stamp 314, sensor location 316 and aircraft identification 318 may be associated with each set of image data 308, temperature data 310 and audio data 312 in the reference table 300 and exceedance table 302. The new data 306 is stored in the reference table 300 in response to the data not exceeding the predetermined threshold or there being an acceptable correlation or high correlation between the new data 306 and the previously stored data for the aircraft and sensor location in the reference table 300. The new data is stored in the exceedance table 302 in response to the new data 306 exceeding the predetermined threshold or there being a large dissimilarity or low correlation between the new data 306 and the previously stored data in the reference table 300.

Referring back to FIG. 2, in block 218, if no anomaly exists, the data is stored in the referenced table 300 and the method 200 may return to block 212. The method 200 may then proceed similar to that previously described. If the new data 306 exceeded the predetermined threshold value and an anomaly appears to exist, the data may be stored in the exceedance table 302 and the method 200 may advance to block 220. In block 220, additional new data may be acquired for the particular sensor location or sensor to confirm that the anomaly exists to minimize the probability of a false alarm. The exceedance table 302 may be checked or each set of new data may be compared to data in the exceedance table 302 to confirm existence of the anomaly.

In block 222, a determination may be made whether the anomaly persists. If the anomaly does not persist, the method 200 may return to block 212 and the method 200 may proceed similar that previously described. If the anomaly does persist, the method 200 may advance to block 224.

In block 224, an alarm may be raised or generated in response to the new data from a particular sensor or sensor location exceeding the predetermined threshold for a preset number of samples of the new data from the particular sensor or sensor location, or expiration of a preset time period. The data set that caused the alarm to be triggered or generated may be stored separately in a new table that may be used for future comparisons.

Scenarios may occur when a new set of input data is collected that may intersect with an entry in reference table 300 or exceedance table 302 but not both. In some cases there may not be any intersection and in that situation the new set of data may be entered in the exceedance table 302 and an alarm generated.

The data stored in the database 136 associated with the ground monitoring facility server 134 may also be utilized to analyze the time taken to load and unload cargo and incorporate any changes to improve efficiency.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Conventional wireless gate links such as Wi-Fi and Cellular can provide off-board communications but are subject to congestion near the airport terminal area, cannot reliably provide video streaming off of the airplane due to the requirement to have multiple video streams of 1-3 Mbps for the surveillance system, and have Wi-Fi security issues. A conventional cellular gate link is more secure, however, current 3G capabilities are limited in bandwidth and 4G capabilities provide the higher bandwidth but the cost would be prohibitive to provide constant streaming of the high bandwidth video over the cellular backbone.

Embodiments of the present invention include video streaming off the airplane using a link powerline communications system that provides a secure Internet Protocol (IP) backbone with large bandwidth (about 100 Mbps) that can be used to reliably stream the video off of the airplane at the airport gate. Since this is a wired interface there is no issue with wireless congestion seen with Wi-Fi based gate link and does not incur the high costs associated with Cellular gate link. Use of high compression codecs such as MPEG-4 H.264 will allow high definition video to be transmitted via a Link (power line communications) at reasonable bandwidths per video stream. In addition autonomous operation coupled with remote control over the IP based Link using Simple Network Management Protocol (SNMP) or web services would provide a highly capable system for the airlines.

Since conventional gate link physical layers are wireless and cannot maintain video streams reliably, embodiments of the present invention solve this by using the link physical layer to provide a streaming video link off of the airplane that is a secure and reliable communication link for this function.

Video surveillance is a capability that the airlines require to secure the airplane cabin, flight deck and cargo areas. On the ground, video surveillance is used to monitor internal and external areas to secure the airplane and eliminate unwanted intrusion and tampering. Off-board monitoring of this video is advantageous as it reduces the need to have personnel on-board the aircraft and the video can be stored off of the airplane. Implementing Link (Power line communications), as the off-board gate link, a secure method of data transfer between the airplane and the airline back office can be realized.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A system for monitoring an aircraft interior, comprising:
   a multiplicity of sensors each placed at a selected location of a plurality of locations within the aircraft interior, each sensor being configured to monitor a condition in an associated area of the aircraft interior;
   a server onboard the aircraft, the onboard server being connected to the multiplicity of sensors and being configured to receive data from each of the multiplicity of sensors and to control operation of each of the multiplicity of sensors; and
   a router onboard the aircraft, the onboard router being connected to the onboard server and the onboard router being configured to communicate with a router off-board the aircraft and to transfer data from the onboard server to the off-board router, wherein the off-board router is associated with a ground monitoring facility that is configured to analyze data from each of the multiplicity of sensors; and
   an off-board database associated with the ground monitoring facility, wherein the data from the multiplicity of sensors is stored in the off-board database, the off-board database comprising a reference table configured to store the data from each of the multiplicity of sensors that is within limits and an exceedance table to store data from the multiplicity of sensors that exceeds a predetermined threshold, wherein the ground monitoring facility is configured to perform a method comprising:
      comparing new data from each sensor to previously stored data for the sensor in the reference table;
      storing the new data in the reference table in response to the data not exceeding the predetermined threshold;

storing the new data in the exceedance table in response to the new data exceeding the predetermined threshold;

acquiring additional samples of new data from a particular sensor in response to the new data from the particular sensor exceeding the predetermined threshold;

comparing each additional sample of new data from the particular sensor to previously stored data in the reference table;

comparing each additional sample of new data from the particular sensor to previously stored data in the exceedance table to confirm that an anomaly persists in response to a dissimilarity between each additional sample of new data and the previously stored data in the reference table; and generating an alarm in response to the anomaly persisting and the additional samples of new data from the particular sensor exceeding the predetermined threshold for a preset number of samples of the additional samples of new data from the particular sensor or expiration of a preset time period.

2. The system of claim 1, wherein the multiplicity of sensors comprises a set of video cameras each placed to monitor a particular portion of a cargo area of the aircraft.

3. The system of claim 1, wherein the multiplicity of sensors comprises a set of video cameras, a set of audio sensors and set of temperature sensors, wherein data from the multiplicity of sensors is gathered in a compressed file that is divided into different areas of the aircraft interior by predefined sampling intervals.

4. The system of claim 1, further comprising an onboard database associated with the onboard server for storing data received from each of the multiplicity of sensors.

5. The system of claim 1, further comprising a data over power line interface associated with the onboard router for communication with the off-board router, wherein the onboard router is connectable to the off-board router by a power line that supplies power to the aircraft when the aircraft is parked at a gate at an airport.

6. The system of claim 1, further comprising a data over power line communications interface and a wireless communications interface associated with each of the onboard router and the off-board router for communications between the routers, wherein the onboard router is connectable to the off-board router by either a wired communications link via the data over power line communications interfaces or a wireless communications link via the wireless communications interfaces.

7. The system of claim 1, wherein the onboard server is configured to activate each sensor to monitor the condition in the associated area of the aircraft interior in response to a set of signals comprising a first signal indicating a weight on wheels configuration of the aircraft and a second signal indicating a parked configuration or zero velocity condition of the aircraft.

8. The system of claim 7, wherein the onboard server is configured to activate each sensor in a cargo area of the aircraft in response to the set of signals comprising the first signal, the second signal and a third signal indicating an opening of a door to the cargo area, the onboard server being configured to deactivate each sensor in the cargo area in response to a fourth signal indicating each door to the cargo area being closed.

9. The system of claim 1, wherein the off-board database stores the data from each sensor in association with an identification of the aircraft, the location of the sensor and a time stamp when the data was received by the onboard server.

10. The system of claim 1, further comprising an onboard database associated with the onboard server, wherein the onboard database is configured to store the data from the sensors in response to the onboard server being unable to establish a secure communications link with the ground monitoring facility, the data stored in the onboard database is transferred to the ground monitoring facility when the onboard server is able to establish the secure communication link with the ground monitoring facility and the data is deleted from the onboard database after being transferred to the ground monitoring facility.

11. The system claim 10, wherein the multiplicity of sensors comprises a set of video cameras, a set of audio sensors and a set of temperature sensors, the data from each sensor is stored with at least an associated time stamp when the data was received by the onboard server and a location of the sensor, and wherein an identification of the aircraft is associated with the data when transferred to the ground monitoring facility.

12. The system of claim 1, wherein the onboard server is further configured to establish network connectivity to the ground monitoring facility by performing a method comprising:

receiving, by the onboard server, an internet protocol (IP) address from an off-board server;

establishing the onboard server as an endpoint with an off-board communications network;

transmitting a request by the onboard server to establish a connection with the ground monitoring facility;

authenticating the onboard server with the ground monitoring facility; and establishing a secure communications link for secure transfer of data between the onboard server and the ground monitoring facility.

13. The system of claim 1, further comprising:

an off-board server associated with the off-board database; and an anomaly detection module operating on the off-board server, the anomaly detection module being configured to detect an anomaly in the data from the multiplicity of sensors and to generate a notification in response to the anomaly being detected.

14. The system of claim 1, further comprising a communications link coupled to the ground monitoring facility for receiving gate situational awareness data.

15. A system for monitoring an aircraft interior, comprising:

a ground monitoring facility configured to analyze data from a multiplicity of sensors each placed at a selected location of a plurality of locations within the aircraft interior, each sensor being configured to monitor a condition in an associated area of the aircraft interior; and an off-board router associated with the ground monitoring facility, the off-board router being configured to communicate with a router onboard the aircraft, the onboard router being connected to an onboard server and the onboard router being configured to transfer data from the onboard server to the off-board router and the ground monitoring facility, wherein the onboard server is connected to the multiplicity of sensors and the onboard server is configured to receive data from each of the multiplicity of sensors and to control operation of each of the multiplicity of sensors; and an off-board database associated with the ground monitoring facility, wherein the data from the multiplicity of sensors is stored in the off-board database, the off-board database comprising a reference table configured to store the data from each of the multiplicity of sensors that is within limits and an exceedance table to store data from the multiplicity of sensors that exceeds a predetermined threshold, wherein the ground monitoring facility is configured to perform a method comprising:
comparing new data from each sensor to previously stored data for the sensor in the reference table;
storing the new data in the reference table in response to the data not exceeding the predetermined threshold;
storing the new data in the exceedance table in response to the new data exceeding the predetermined threshold;
acquiring additional samples of new data from a particular sensor in response to the new data from the particular sensor exceeding the predetermined threshold;
comparing each additional sample of new data from the particular sensor to previously stored data in the reference table;
comparing each additional sample of new data from the particular sensor to previously stored data in the exceedance table to confirm that an anomaly persists in response to a dissimilarity between each additional sample of new data and the previously stored data in the reference table; and
generating an alarm in response to the anomaly persisting and the additional samples of new data from the particular sensor exceeding the predetermined threshold for a preset number of samples of the additional samples of new data from the particular sensor or expiration of a preset time period.

16. The system of claim 15, further comprising a data over power line communications interface and a wireless interface associated with each of the off-board router and the onboard router for communications between the routers, wherein the off-board router is connectable to the onboard router by either a wired communications link via the data over power line communications interfaces or a wireless communications link via the wireless interfaces.

17. The system of claim 15, further comprising an off-board database associated with the ground monitoring facility for storing the data from the multiplicity of sensors, the multiplicity of sensors comprising a set of video cameras.

18. The system of claim 17, wherein the off-board database stores the data from each sensor in association with an identification of the aircraft, the location of the sensor and a time stamp when the data was received by the onboard server.

19. The system of claim 18, wherein the ground monitoring facility comprises an anomaly detection module configured to detect anomalies in the data from the multiplicity of sensors and to generate an alarm in response an anomaly being detected, and wherein the off-board database comprises a reference table configured to store the data from each of the multiplicity of sensors that is within limits and an exceedance table to store data from the multiplicity of sensors that exceeds a predetermined threshold, the alarm being generated in response to the data from a particular sensor exceeding the predetermined threshold for a preset number of samples of the data from the particular sensor or expiration of a preset time period.

20. A method for monitoring an aircraft interior, comprising:
establishing, by an onboard server, communications with each of a multiplicity of sensors, each sensor being placed at a selected location of a plurality of locations within the aircraft interior and each sensor being configured to monitor a condition in an associated area of the aircraft interior;
establishing, by the onboard server, communications with a ground monitoring facility configured to analyze the data from each of the multiplicity of sensors to detect anomalies, wherein the onboard server is connected to an onboard router and the onboard router establishes direct communications with an off-board router, the off-board router being communicatively coupled to the ground monitoring facility;
storing the data from the multiplicity of sensors in an off-board database associated with the ground monitoring facility, wherein the off-board database comprises a reference table configured to store the data from each of the multiplicity of sensors that is within limits and an exceedance table to store data from the multiplicity of sensors that exceeds a predetermined threshold, wherein the ground monitoring facility is configured to perform a method comprising:
comparing new data from each sensor to previously stored data for the sensor in the reference table;
storing the new data in the reference table in response to the data not exceeding the predetermined threshold;
storing the new data in the exceedance table in response to the new data exceeding the predetermined threshold;
acquiring additional samples of new data from a particular sensor in response to the new data from the particular sensor exceeding the predetermined threshold;
first checking each additional sample of new data from the particular sensor to previously stored data in the reference table;
next checking each additional sample of new data from the particular sensor to previously stored data in the exceedance table in response to a dissimilarity between the additional sample of new data and the previously stored data in the reference table; and
generating an alarm in response to the additional samples of new data from the particular sensor exceeding the predetermined threshold for a preset number of samples of the additional samples of new data from the particular sensor.

* * * * *